July 4, 1950  B. W. KEESE ET AL  2,513,333
POWER TAKE-OFF MECHANISM
Filed April 23, 1946  4 Sheets-Sheet 1

Beverly W. Keese &
Charles A. Cook
INVENTORS

BY
Strauch & Hoffman
ATTORNEYS

July 4, 1950     B. W. KEESE ET AL     2,513,333
POWER TAKE-OFF MECHANISM
Filed April 23, 1946     4 Sheets-Sheet 2

Beverly W. Keese &
Charles A. Cook
INVENTORS

BY
Strauch & Hoffman
ATTORNEYS

July 4, 1950  B. W. KEESE ET AL  2,513,333
POWER TAKE-OFF MECHANISM
Filed April 23, 1946  4 Sheets-Sheet 3
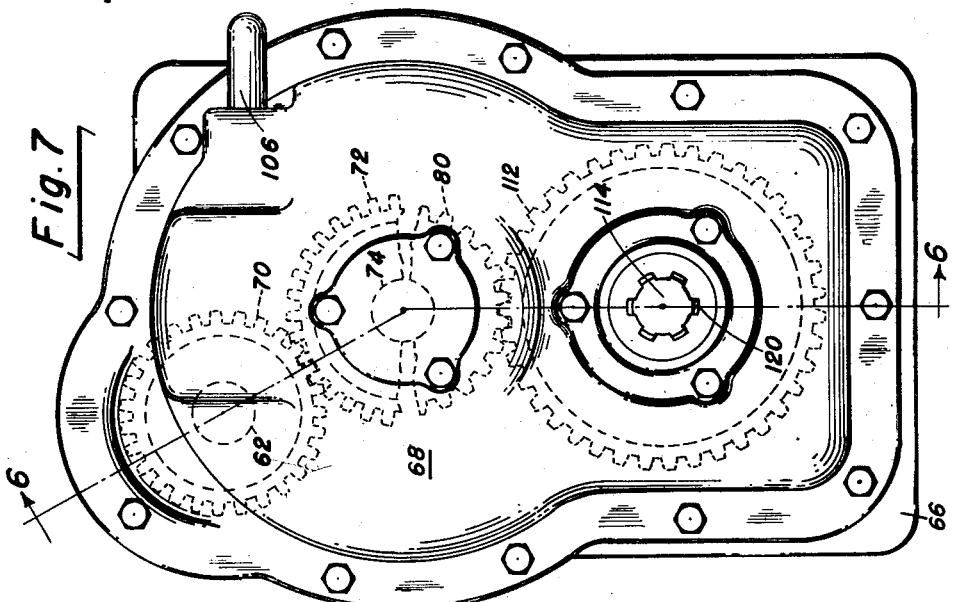
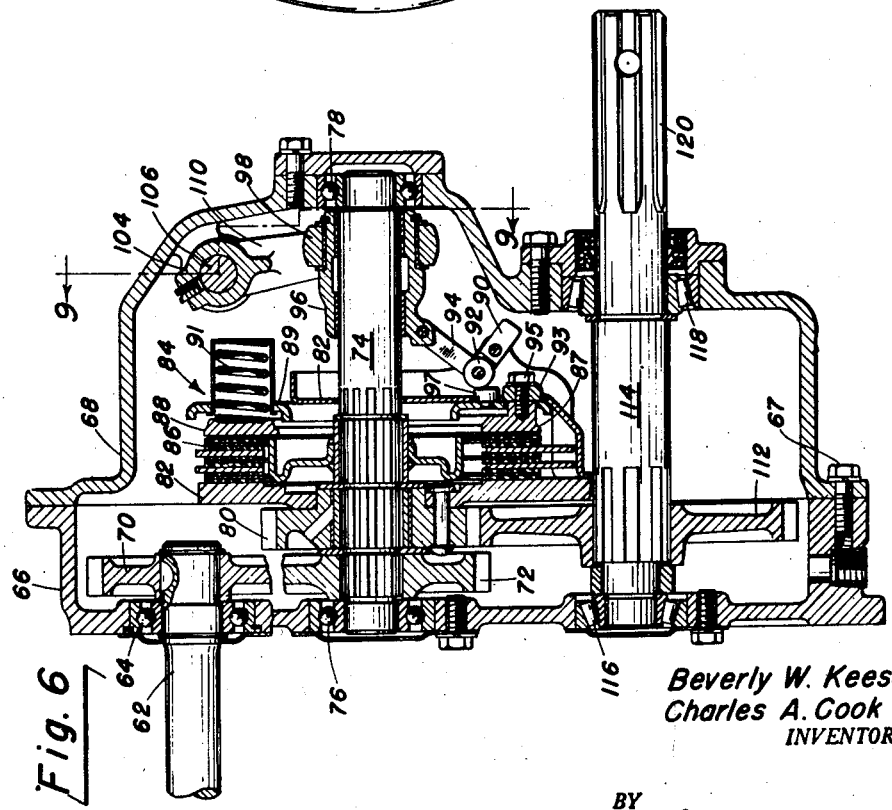
Beverly W. Keese &
Charles A. Cook
INVENTORS
BY
Strauch & Hoffman
ATTORNEYS

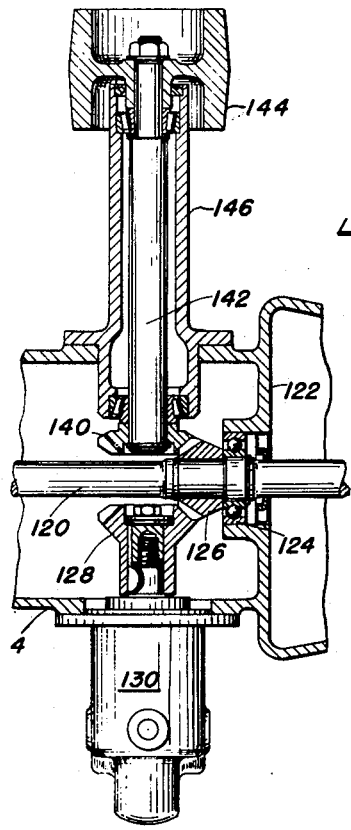
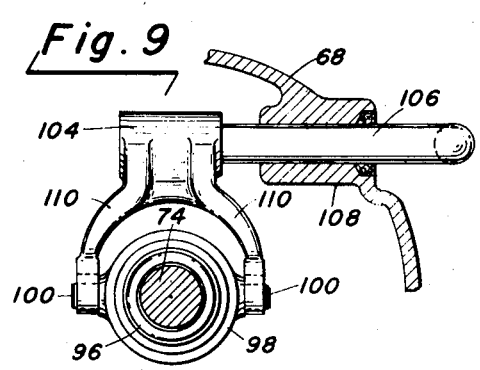

Patented July 4, 1950

2,513,333

UNITED STATES PATENT OFFICE 2,513,333

POWER TAKE-OFF MECHANISM

Beverly W. Keese and Charles A. Cook, Oshkosh, Wis., assignors to The Timken-Detroit Axle Company, Detroit, Mich., a corporation of Ohio Application April 23, 1946, Serial No. 664,185

2 Claims. (Cl. 74—15.84)

1

This invention relates to power take-off mechanisms for tractors or other motor-driven vehicles operable simultaneously with the vehicle driving mechanism or independently thereof.

When a tractor is used to pull another vehicle, and at the same time drive a mechanism carried by said vehicle from the tractor power plant, such as a combine, the engine is sometimes stalled in initiating movement of the tractor and other vehicle and simultaneously transmitting motion to the parts of the mechanism carried by said vehicle.

When a combine, or a similar mechanism, is being operated by a tractor, prevailing conditions, such as varying density of the crop being harvested, frequently necessitate a change in the forward speed of the machine, without changing the speed of the harvesting mechanism.

It is accordingly the salient object and purpose of the present invention, to provide a power take-off mechanism for a motor-driven tractor or other vehicle equipped with a power-transmission clutch operative to connect or disconnect the vehicle driving mechanism with or from the power plant, together with means directly associated with the clutch and operative to transmit live power to the take-off mechanism in the engaged or disengaged position of clutch. Thus the operation of the mechanism carried by a vehicle drawn by the tractor may be initiated prior to the forward motion of the tractor and vehicle, and such mechanism may be operated concurrently with the movement of the tractor and vehicle, or while the tractor-driving mechanism is disconnected from the power source.

It is another object of the invention to provide a novel power take-off mechanism driven at a speed directly proportional to the engine speed regardless of changes in the driving speed of the tractor or other vehicle.

It is a further object of the invention to provide a simple and reliably functioning means to adapt a standard type of clutch for the continuous transmission of live power to the auxiliary mechanism being operated, while said clutch functions in the usual manner to interrupt transmission of power to the vehicle driving mechanism, at the will of the operator.

An additional object of the invention is to provide a power take-off mechanism as above characterized, designed as accessory equipment which may be readily mounted in operative position on the vehicle when its use is required.

It is still another object of the present invention to provide a power take-off and reduction gear unit mounted on the rear end of the tractor or other vehicle which operates to appreciably reduce the torque load on the long power take-off drive shaft extending to the front of the vehicle where it is operatively connected with the power transmission clutch mechanism.

The present invention further contemplates the provision of a power-reduction gear box for the take-off mechanism at the rear of the vehicle, together with a clutch of novel construction in said gear box for interrupting the drive therethrough.

In general, our invention provides a power take-off mechanism for tractors and other vehicles having the several novel features above enumerated, which is distinguished by simplicity of construction, high efficiency operation, and comparatively low production cost.

These and other objects will be apparent upon consideration of the following description in connection with the accompanying drawings, in which similar reference characters designate corresponding parts throughout the several views and wherein:

Figure 6 is a vertical sectional view through the power take-off reduction gear box, taken substantially on the line 6—6 of Figure 7.

Figure 7 is a rear end elevation of the reduction gear box.

Figure 8 is a detail horizontal sectional view taken substantially on the line 8—8 of Figure 1 and Figure 9 is a detail vertical sectional view taken substantially on the line 9—9 of Figure 6.

Figure 1:
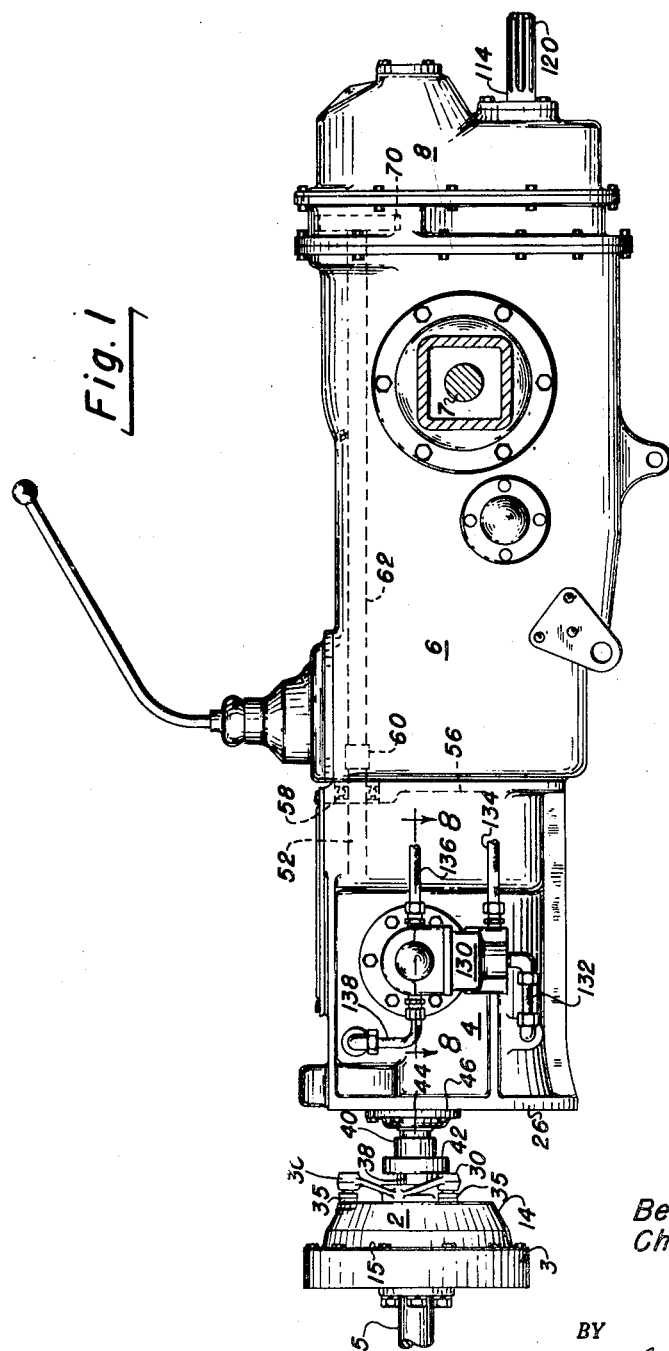
Figure 1 is a side elevation showing one general assembly of vehicle drive units provided with a selected embodiment of our present invention.

Referring in further detail to the drawings, in Figure 1 thereof, we have illustrated one general assembly of the driving units mounted in the body or frame of a tractor or other vehicle in any approved manner. For purposes of illustration, we have shown a housing structure 6 enclosing the variable speed transmission and final drive mechanism, the latter being operatively connected with the vehicle wheel shafts, one of which is indicated at 7. A coupling housing 4 extends forwardly from the housing structure 6 and in advance of this housing 4 a power transmission clutch unit 2 is associated with the transmission drive shaft and flywheel 3 suitably fixed to the rear end of the engine shaft 5. A speed reduction gear box 8, to be presently more fully described, is mounted on the rear end of the housing structure 6.

The unit 2 is a normally engaged standard type of friction clutch and includes the clutch fingers 10 pivotally mounted upon studs 12 fixed at one of their ends in the wall of housing 14 and slidably supporting at their other ends a pressure plate 16. The marginal flange 15 of housing 14 is suitably secured to the face of the flywheel 3. Pressure plate 16 engages friction facing 17 of a clutch disk 18 mounted on a hub-sleeve 19 splined or otherwise non-rotatably mounted on the forward end of the transmission drive shaft 20.

Figure 2:
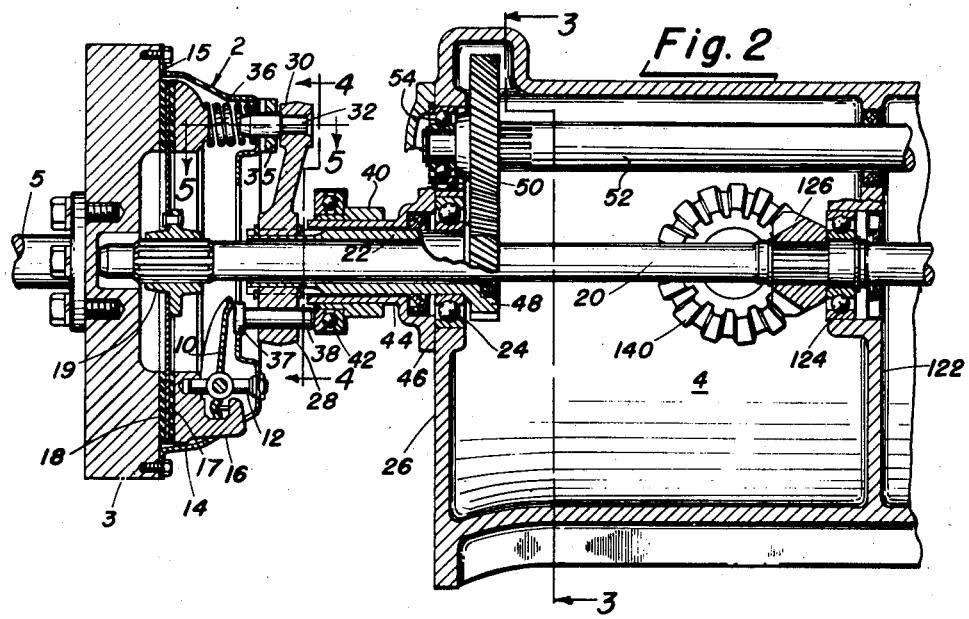
Figure 2 is a fragmentary vertical sectional view showing the clutch mechanism and power-transmitting connections with the vehicle transmission driving shaft and the driving shaft of the power take-off mechanism.
Figure 5:
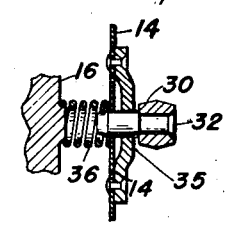
Figure 5 is a detail horizontal sectional view taken on the line 5—5 of Figure 2.
Figure 4:
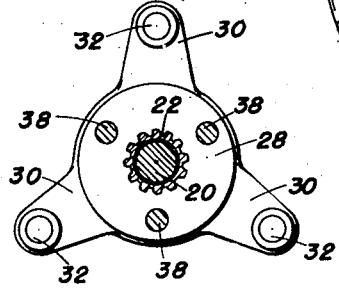
Figure 4 is a detail vertical sectional view taken on the line 4—4 of Figure 2.
Figure 3:
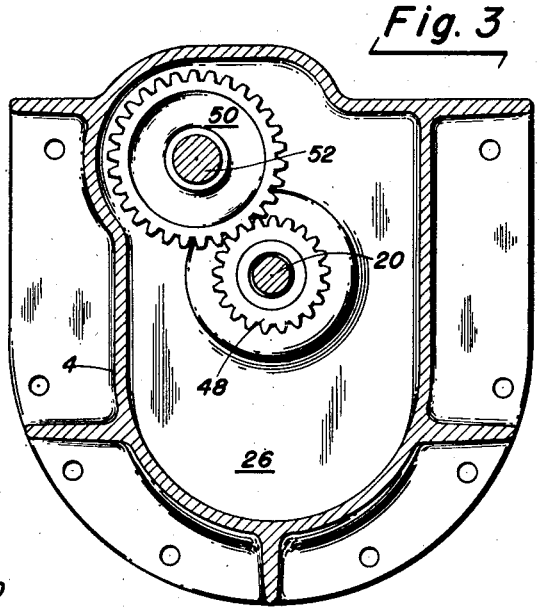
Figure 3 is a transverse vertical section taken substantially on the line 3—3 of Figure 2.

A relatively rotatable tubular shaft 22 surrounds the shaft 20 in concentric relation thereto and is journalled at its rear end in a bearing 24 mounted in the front wall 26 of coupling housing 4. A spider 28 is splined or otherwise non-rotatably secured on the forward end of the shaft 22, each arm 30 of said spider carrying a pin 32 at its outer end, said pins being equidistantly spaced from the axes of shafts 20 and 22 and in axial parallelism therewith. As shown in Figure 2, the spider 28 is removably held against axial movement on shaft 22 by conventional snap rings. It will be noted from reference to Figure 2 of the drawings that the spider arms 30 are preferably obliquely inclined relative to the plane of the spider hub and the pins 32 have close-fitting engagement through registering openings in the wall of housing member 14 and in the reinforcing plates 35 which are riveted, welded or otherwise secured at their ends to the wall of said housing member. Within the clutch housing springs 36 each bear at one end against the pressure plate 16 and surround the pins 32 at the other end in bearing contact with the wall of housing member 14.

Pins 38, corresponding in number to the number of clutch fingers 10, are slidably mounted in apertures in the hub of the spider 28. These pins at one of their ends are provided with heads 37 for bearing contact against the inner ends of the respective fingers 10 and at their other ends have contact with a thrust bearing 42 carried by a collar 40 slidably mounted on the hub extension 44 of the flanged cap member 46 secured to the wall 26 of housing 4 and which retains bearing 24 against outward axial movement therefrom.

From this description, it will be readily seen that by means of spider 28 and pins 32, shaft 22 and the parts of the clutch mechanism mounted on flywheel 3 are connected against relative rotation. Any conventional manually operable means may be provided for shifting the collar 40 to actuate the clutch fingers 10 and disconnect the transmission drive shaft 20 from the source of power.

The shaft 22 at its rear end, within housing 4, is provided with a gear 48, which is in constant mesh with gear 50, splined or otherwise fixed on the forward end of the power take-off drive shaft 52 which is journalled in bearing 54 mounted in the front wall 26 of the housing 4. As seen in Figure 1 of the drawings, the rear end of the shaft 52 is journalled in bearing 58 mounted in the rear end wall 56 of housing 4 and extends into transmission housing 6 where it is detachably coupled as at 60 with the forward end of a shaft 62 which extends longitudinally through the housing structure and at its rear end terminates within the reduction gear box 8.

As shown most clearly in Figure 6 of the drawings, the reduction gear box includes two sections 66 and 68 having meeting flanges bolted together as at 67 to form a compartment housing the reduction gearing and the clutch mechanism for the transmission of power to the final power take-off shaft. The rear end of shaft 62 is journalled in a bearing 64 mounted in the wall of housing section 66. Within the gear box the gear 70 is keyed or otherwise fixed to the end of shaft 62 and is in constant mesh with the gear 72 non-rotatively splined or otherwise secured upon the forward end of the clutch shaft 74 which is journalled in bearing 76 mounted in the wall of gear box section 66. The other or rear end of this clutch shaft is journalled in bearing 78 similarly mounted in the wall of gear box section 68.

At the rear side of gear 72, a gear 80 is loosely mounted on clutch shaft 74, and to this gear the housing 82 for a friction clutch assembly 84 is non-rotatively secured. The clutch assembly includes springs 91 in housings on disk 89 having pressure contact with plate 88. This plate is formed with boss 87 on which disk 89 is supported for movements towards and from the plate 88. Movement of disk 89 in one direction under the pressure of springs 91 is limited by the stop 93 secured to the end of boss 87 by bolt 95 and movable in an elongated opening provided in the wall of housing 82. A stud 97 fixed to the disk 89 adjacent to stop 93 projects outwardly through said opening in the housing wall. A link 90 is pivotally mounted intermediate its ends on the housing 82 and is provided at one end thereof with a roller 92 bearing against the stud 97. This end of link 90 is connected with one end of link 94, the other end of which is pivotally connected to a slidable sleeve 96 on the clutch shaft 74. This sleeve at one of its ends has an external groove loosely receiving collar 98 which is provided at diametrically opposite points with trunnions 100. A clutch fork 104 is fixed to one end of an actuating member or shaft 106 journalled in a bearing box 108 provided on the wall of the rear section 68 of the gear box. The arms 110 of this fork at their ends are operatively connected with the respective trunnions 100 on the collar 98.

To the output shaft 114 of the take-off unit, large gear 112 is splined or otherwise fixed and is in constant mesh with the clutch gear 80. At its forward end this shaft is journalled in bearing 116 mounted in the wall of gear box section 66. This shaft extends through the wall of gear box section 68 where it is also journalled in bearing 118, the rearwardly extending end of said shaft being splined as indicated at 120 or provided with other suitable means for coupling connection with the mechanism to be driven thereby.

Referring now to Figure 8 of the drawings, the transmission drive shaft 120 is journalled by bearing 124 mounted in the intermediate wall 122 of the coupling housing 4. On said shaft adjacent to this bearing a bevel gear 126 is suitably fixed.

An hydraulic pump 130 is detachably mounted over an opening in one side wall of the housing 4 and has its shaft disposed normal to the axis of shaft 20 and provided with a bevel gear 128 in constant mesh with the gear 126. As seen in Figure 1 of the drawings the pump 130 is supplied with the hydraulic medium through the inlet line 132 from a suitable reservoir, for which purpose the interior of housing 4 may conveniently be employed. The hydraulic medium is supplied under pressure by pump 130 through the line 134 to the mechanism or implement to be operated thereby and is returned to the cylinder of the pump through the line 136. The hydraulic medium is returned from the pump to the reservoir through line 138.

Diametrically opposite to the pump 130, a gear 140 in constant mesh with gear 126, is fixed to one end of the shaft 142 which is journalled in the opposite ends of a bearing sleeve 146 detachably mounted at the end thereof adjacent gear 140 in an opening in a side wall of housing 4. To the other end of the shaft 142 a belt drive pulley 144 is suitably fixed.

In the operation of the above-described mechanism, assuming that a combine or other vehicle is connected to the rear end of the tractor and mechanism carried by said vehicle is operatively coupled to the power take-off shaft 114; before starting the engine, the operator first moves the collar 40 forwardly. Pins 38 are thus moved forwardly through the hub of spider 28 to actuate the clutch fingers 10 and move pressure plate 16 rearwardly against the resistance of springs 36 to relieve the pressure of clutch disk 18 against the face of the flywheel 3. Thus, when the engine is started, no power will be transmitted through the transmission drive shaft 20 to the tractor driving mechanism. However, since the parts of clutch unit 2 mounted on flywheel 3 rotate as a unit therewith and are rigidly connected by pins 32 and spider 28 with the coaxial tubular shaft 22, this shaft will be rotated to transmit power through the gears 48 and 50 to the power take-off drive shafts 52 and 62. Gear 70 on shaft 62 drives gear 72 and shaft 74 and with clutch assembly 82—86 in engaged position gear 80 is rotated as a unit with shaft 74 to drive gear 112 and power take-off shaft 114.

After disengaging clutch 2 or shifting the change speed transmission to neutral to render the tractor driving mechanism inoperative, with clutch 84 in disengaged position, the engine is started to drive shafts 52, 62 and 74 as above explained.

Power is transmitted through the reduction gearing from shaft 74 to shaft 114 by operating member 106 to shift sleeve 96 to the left from the position shown in Figure 6. Roller 92 is thus moved by toggle links 90—94 to urge plate 89 inwardly and compress springs 91 which in turn compress disk assembly 86 and establishes a solid connection between said disk assembly fixed to clutch shaft 74 and casing 82 on gear 80. The gear and shaft are thus caused to rotate as a unit to drive gear 112 and shaft 114. The combine or other mechanism may thus be operated at the proper speed while the tractor is stationary and before it advances into the grain or other crop. Clutch 2 is then engaged to operate shaft 20 and the tractor driving mechanism at any desired ground speed. Of course, there is a continued, uninterrupted transmission of power to shaft 114 and the combine or other auxiliary mechanism through the tubular shaft 22 which continues to rotate as a unit with shaft 20 by reason of its connection, as above described, with the flywheel carried parts of clutch unit 2.

Operation of shaft 114 and the auxiliary mechanism coupled therewith may be discontinued at any time independently of clutch unit 2 by shifting sleeve 96 to the right so that the parts of clutch 84 will resume the positions shown in Figure 6 and break the driving connection between shaft 74 and gear 80.

It will be seen that the present invention provides a take-off reduction gear unit and clutch assembly together with shaft 62 as an accessory which may be readily mounted in operative position by the owner of the tractor or vehicle and coupled to shaft 52. When the power take-off is not in use, the opening at the rear end of housing structure 6 may be closed by means of a suitable cover plate. Similarly the hydraulic pump assembly 130 and pulley assembly 144 may be supplied as accessory units which may be readily mounted in operative position as required and drivingly connected with gear 126 on transmission drive shaft 20.

From the foregoing description it will also be appreciated that we have provided a power take-off assembly which may be readily applied to a conventional tractor or other motor driven vehicle for operation with or independently of the vehicle driving mechanism, without requiring material structural alterations of the standard type power transmission clutch. The several cooperating elements employed are of rugged and durable structural form, so that maximum operating efficiency with low maintenance expense will be realized.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a vehicle having a variable speed transmission, a final drive mechanism for the vehicle wheels and a power take-off assembly arranged in longitudinal succession and enclosed in a housing, an engine driven flywheel, a transmission drive shaft having a releasable clutch connection with said flywheel, a power take-off drive shaft journaled at opposite ends in a forward housing wall and in an internal wall rearwardly of said final drive mechanism and projecting through said internal wall, said power take-off drive shaft extending through said housing independently of said transmission, a sleeve coaxial with said transmission shaft constantly drive connected at opposite ends to said flywheel and said power take-off drive shaft whereby the latter may be driven while the clutch is disengaged, a rotatable power take-off shaft projecting from the rear of said housing, and clutch mechanism rearwardly of said internal wall interposed between said power take-off drive shaft and said power take-off shaft.

2. In the vehicle defined in claim 1, said internal wall comprising part of a removable rear closure for the final drive mechanism chamber of said housing, and a cover for said power take-off assembly removably secured upon said closure and constituting the rear end of said housing.

BEVERLY W. KEESE.
CHARLES A. COOK.

REFERENCES CITED

The following references are of record in the file of this patent:

UNITED STATES PATENTS

| Number | Name | Date |
|---|---|---|
| 1,225,202 | Ahle | May 8, 1917 |
| 1,587,205 | Whitten | June 1, 1926 |
| 1,860,246 | Horste | May 24, 1932 |
| 1,961,809 | Wood | June 5, 1934 |
| 1,993,405 | Heitshu | Mar. 5, 1935 |
| 2,034,778 | Storey | Mar. 24, 1936 |
| 2,140,687 | Brown | Dec. 20, 1938 |
| 2,214,170 | Le Tourneau | Sept. 10, 1940 |
| 2,237,322 | West | Apr. 8, 1941 |
| 2,245,078 | Padgett | June 10, 1941 |
| 2,287,279 | Stumpf | June 23, 1942 |
| 2,287,302 | Gifford | June 23, 1942 |
| 2,290,835 | Lorimor | July 21, 1942 |
| 2,347,352 | Lapsley | Apr. 25, 1944 |
| 2,349,880 | Orelind | May 30, 1944 |
| 2,352,270 | Land | June 27, 1944 |